Feb. 14, 1950     H. R. BILLETER     2,497,756
TORQUE MEASURING WRENCH
Filed Dec. 8, 1945     2 Sheets-Sheet 1
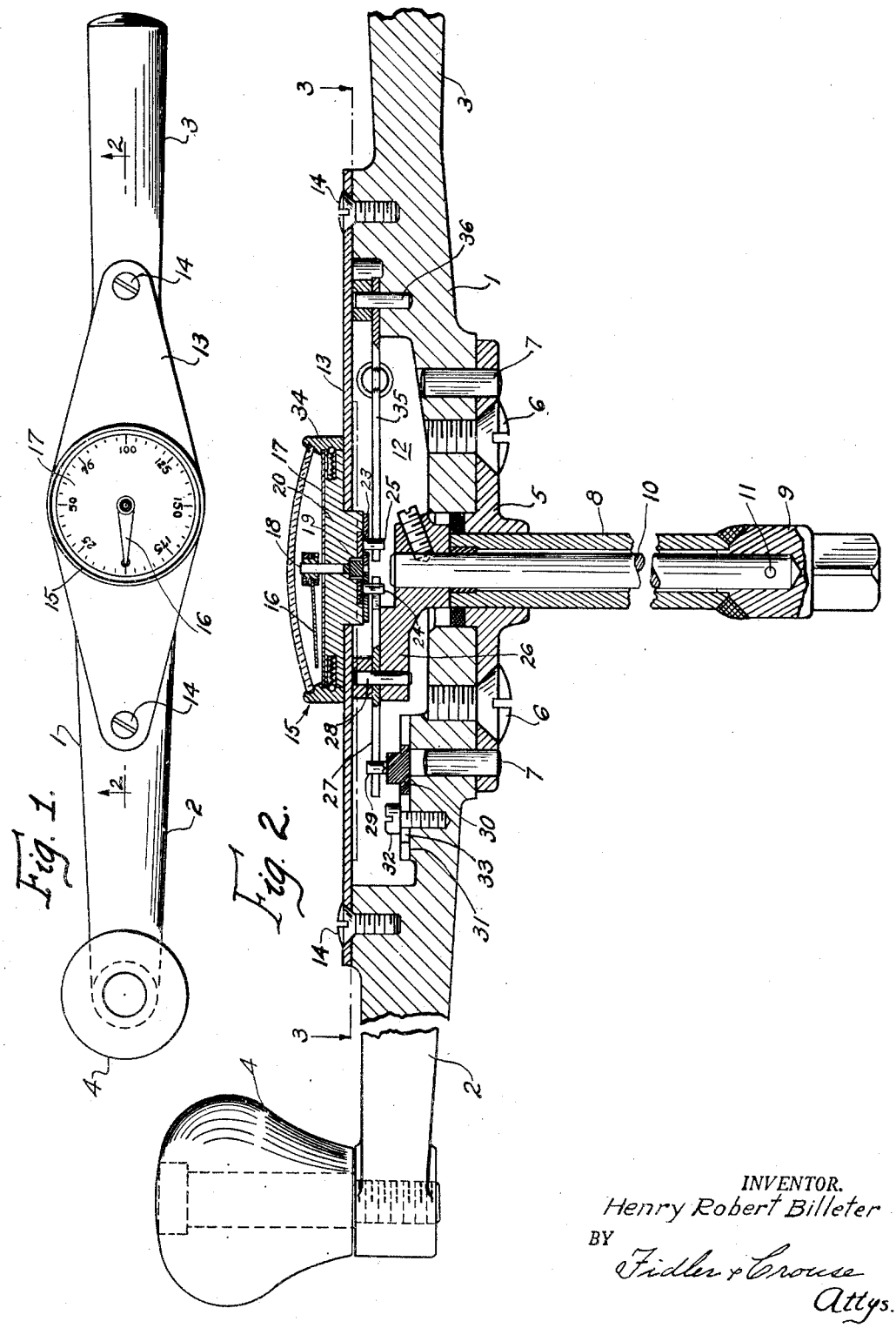
INVENTOR.
Henry Robert Billeter
BY
Fidler & Crouse
Attys.

Feb. 14, 1950 H. R. BILLETER 2,497,756
TORQUE MEASURING WRENCH
Filed Dec. 8, 1945 2 Sheets-Sheet 2
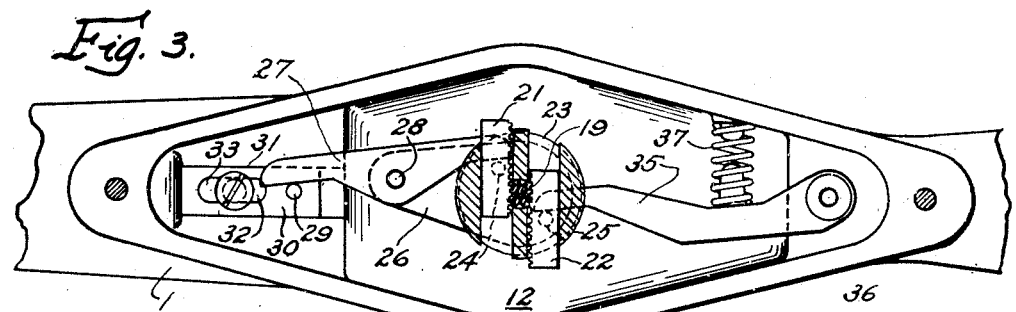
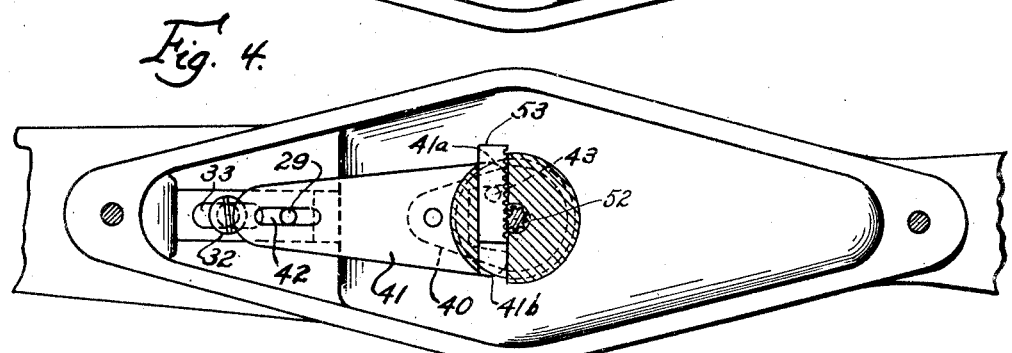
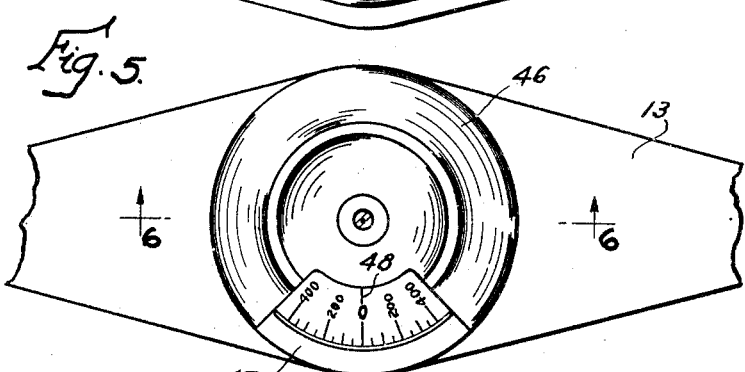
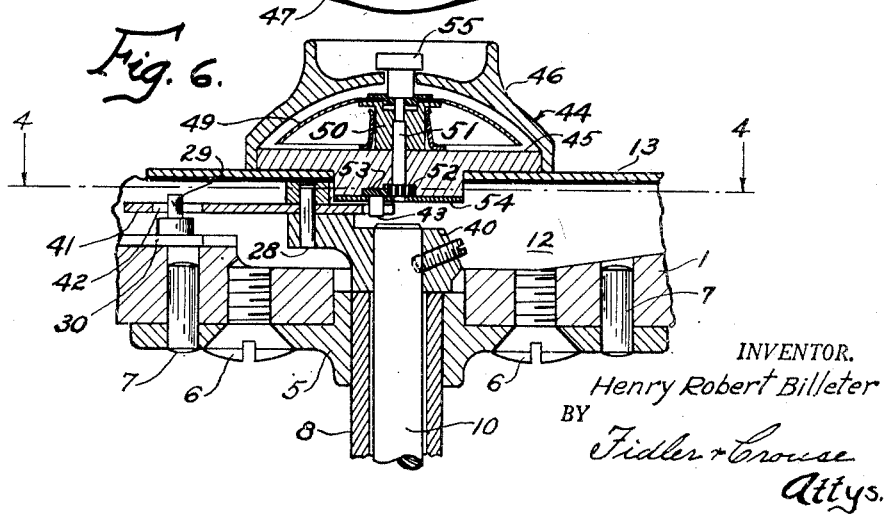
INVENTOR.
Henry Robert Billeter
BY
Fidler + Crouse
Attys.

Patented Feb. 14, 1950

2,497,756

UNITED STATES PATENT OFFICE 2,497,756

TORQUE MEASURING WRENCH

Henry Robert Billeter, Highland Park, Ill., assignor to Ammco Tools, Inc., a corporation of Illinois Application December 8, 1945, Serial No. 633,617

6 Claims. (Cl. 73—139)

This invention relates to torque measuring wrenches and has for one of its objects the provision of an improved wrench of that character which is rugged and durable while at the same time being well adapted for economical volume production.

Another object is to provide torque measuring wrench having a torque tube, the torsional deflection or twist of which is the criterion by which the applied torque is measured.

A further object is to provide a torque measuring wrench which will afford accurate readings notwithstanding commercial variations in the dimensions and physical properties of the torque tube. To this end my invention contemplates the provision of adjustable means for compensating for any such variations from standard as may obtain.

Still another object is to provide a torque measuring wrench of the type referred to above having a minimum number of parts, all of which are capable of being economically produced with such accuracy that wrenches can be assembled from parts picked from stock at random—thereby minimizing initial production cost while at the same time facilitating repairs entailing parts replacements.

An additional object is to provide in a torque measuring wrench means for eliminating lost motion so that the readings of the torque indicating gauge will always be accurate even though high precision is not maintained in the fitting of interconnected parts and notwithstanding looseness between parts resulting from wear.

One of the novel features of my invention lies in the use of a torque tube for transmitting the torsional effort to the work; and in so doing I make use of the twist or torsional deflection of the torque tube as a criterion by which to measure the applied torque. In order to do this without compensating for differences of torsional deflection in response to given torque values, as between various torque tubes taken from stock and supposedly identical, it would be necessary to maintain very close dimensional limits and also to maintain very constant the physical properties of the metal and the heat treatment thereof. To meet such production requirements is, of course, quite costly, and I have avoided the necessity of so doing by providing, as one of the novel features of my invention, a simple and easily adjusted compensating means which is effective to offset any variation which may obtain between various supposedly identical torque tubes.

Another feature of my invention resides in the provision of mechanism effective to eliminate mechanical lost motion in the means for transmitting torsional deflection information from the torque tube to the torque gauge, thus ensuring accurate torque readings in spite of wear, and notwithstanding the absence of close-fitting interconnected parts.

Other objects and advantages will become apparent as the detailed description progresses.

In the drawings which accompany this specification:

Figure 1 is a plan view of a torque measuring wrench according to a preferred embodiment of my invention;

Fig. 2 is another view of the same wrench, but drawn to an enlarged scale, a portion of said view being a section taken along line 2—2 of Fig. 1;

Fig. 3 is a view taken approximately along line 3—3 of Fig. 2;

Fig. 4 is a view similar to Fig. 3 but illustrating a modified version of the invention which may be employed where it is desired to measure the torque irrespective of the direction of rotation of the wrench;

Fig. 5 is a plan view of the indicator which I prefer to employ with the construction of Fig. 4; and Fig. 6 is a sectional view taken along line 6—6 of Fig. 5.

Referring first to the embodiment of Figs. 1, 2 and 3, the wrench structure therein illustrated comprises a head member 1 of any suitable material, having two oppositely extending handles 2 and 3 which serve as levers by means of which rotational force or torque is manually applied to the wrench, and through the wrench to the bolt or nut or other object which is to be rotated. In order to facilitate rapid spinning of the wrench, as for example while a nut or bolt is still free-turning, handle 2 may be provided with a rotatable knob 4.

A flange 5 of steel or other suitable metal is attached to head member 1 by means of screws 6 and is firmly secured against all lateral movement relatively to the head member by means of dowel pins 7.

Firmly attached to flange 5, as by welding, is a tube 8 which preferably is of suitable heat-treated steel tubing, since it must be strong enough to transmit the maximum torque for which the wrench is designed, without exceeding its elastic limit. To the lower end of tube 8 is attached, as by welding, a work-engaging element 9 the free end of which may be squared to receive a convenional wrench socket (not shown). Said work-engaging element may be of appropriate design, alternatively to that shown, to accommodate any special job for which a particular wrench may be intended. Torque tube 8 may be of any convenient length and, in any event, should always be long enough so that it will undergo a satisfactorily measurable twist or torsional deflection in response to the minimum torque which it is desired to indicate.

A rod 10 disposed within the bore and extending axially of torque tube 8 is fixedly secured at its lower end to work-engaging element 9 by means of a dowel pin 11. Said rod extends upwardly through the torque tube into a chamber 12 formed in head member 1 and rotates with work-engaging element 9. Since torque tube 8 necessarily undergoes a torsional deflection or twist which is proportional to the applied torque, it follows that there is relative rotation between the upper end of rod 10 and the upper end of the torque tube.

Chamber 12 is normally closed by means of a coverplate 13 which is detachably secured to head member 1 by means of screws 14. Mounted on and carried by coverplate 13 and preferably in axial alignment with torque tube 8 and rod 10, is a torque gauge 15 having a rotatable index finger 16 adapted to traverse a scale on a dial 17, which scale is calibrated in foot-pounds or other suitable units of torque. Index finger 16 is carried by and rotatable with a shaft 18 to the lower end of which is attached a pinion 19. The base 20 of the torque gauge is milled on its underside to form two slideways for a pair of racks 21 and 22 which mesh with opposite sides of pinion 19. These racks or slides are flat strips of metal each provided with teeth on one edge, as shown in Fig. 3, and they are held in place in their respective slideways by means of a plate 23. Rack 21 is provided with a depending pin 24 which extends through an elongate slot in plate 23. Rack 22 is similarly provided with a depending pin 25 which extends through another elongate slot in plate 23. Rack 21 is reciprocable lengthwise by applying force to pin 24 laterally, in one direction. Thus, shaft 18 and index finger 16 are caused to rotate. This, of course, involves rotation of pinion 19, which, in turn, causes rack 22 to move, together with its pin 25, in the direction opposite to that of rack 21.

The object, as in all torque measuring wrenches, is to actuate the gauge in proportion to the applied torque; but the extent to which the upper end of rod 10 rotates relatively to the upper end of the torque tube is usually quite small even when the maximum allowable force is applied to the wrench and, therefore, it generally would not be practicable with the type of torque gauge shown to obtain accurate readings by means of a direct connection between shaft 18 and rod 10. In order to obtain a movement of index finger 16 of sufficient magnitude to afford accurate readings, and to permit the use of a scale of satisfactory length, it is necessary to interpose a suitable movement multiplying means between the upper end of rod 10 and shaft 18 so that the latter will rotate preferably several degrees for every degree of rotation of rod 10. To that end there is provided in chamber 12 a movement multiplying mechanism comprising, among other components, an arm 26 and a lever 27. Arm 26 is fixedly secured to the upper end of rod 10 so that it rotates therewith, and lever 27 is pivoted on a pin 28 carried by arm 26. One end of lever 27 bears against one side only of pin 24 while the other end of said lever bears against a lug 29 which operates as a fulcrum for the lever. It will be apparent that rotational movements of rod 10 are transmitted through arm 26, pin 28 and lever 27 to pin 24, and that the torque gauge index finger 16 is thus actuated at an amplified rate whenever torsional force is transmitted through the torque tube, as is always the case when the wrench is in use.

It would be possible to manufacture the device as thus far described with such a degree of precision that highly accurate torque readings would be obtained without providing for any adjustment to compensate for manufacturing variations. But, in order to do so it would be necessary to maintain very close limits on the inside and outside diameter of torque tube 8, as well as on the length thereof. Such requirements, obviously, would entail a good deal of added manufacturing cost which could be avoided if it were not necessary to maintain such close limits; and, as stated at the beginning of this specification, it is one of the primary objects of my invention to eliminate the need for extremely close tolerances.

Pursuant to the above stated objective, lug 29, which operates as a fulcrum for lever 27, is carried by a rectangular block 30 which is slidably mounted in a groove 31 milled in head member 1. Block 30 is held in place by means of a clamping screw 32 which is threaded into the head member and passes through an elongate slot 33 in said block. By loosening screw 32, block 30, together with lug 29, can be moved lengthwise of groove 31. By so doing the center-to-center distance between pin 28 and lug 29 can be varied whereby to adjust the ratio of lever 27. This results in changing the ratio of rotation as between shaft 18 and rod 10 and thus makes it possible to effect an adjustment which will bring about correct gauge readings irrespective of any deviations from standard in the torque tube. The extent of compensation which can be realized by adjusting block 30 is very considerable, but ordinarily, the differences likely to be encountered as between various torque tubes of identical design is not so great as to require the whole range of adjustment which is available with the construction shown. But by making provision for a very considerable range of adjustment of block 30, it becomes possible to produce a line of wrenches which differ widely in the length of the torque tube and of rod 10 but are otherwise alike; and by substituting dials with different scale readings it is practicable to increase still further the variety of wrenches that can be supplied without entailing any major engineering changes. By way of example, the length of the torque tube could be increased or decreased very substantially without involving any additional structural change except the substitution of an apropriately calibrated dial. In adjusting the wrench, a known load is applied, and the dial reading noted. Then, if any discrepancy is shown, coverplate 13 is removed, together with the torque gauge, and block 30 is adjusted in the appropriate direction. The extent of adjustment needed can accurately be estimated by an experienced operator so that usually a single adjustment is enough to effect adequately precise correction.

The above-described wrench is designed to give dial readings only in one direction and the torque gauge shown is of the kind in which dial 17 is carried by the cover 34, which is manually rotatable together with the dial. This enables the dial to be rotated in advance of use whereby to bring the desired torque reading into registration with the index finger so that when the prescribed amount of torque has been applied to the work, the gauge will read zero. But it is immaterial, so far as the present invention is concerned, whether the gauge operates in the manner just described or, alternatively, is of the kind in which the dial is non-adjustable rotationally.

In order to secure accurate readings, it is necessary to eliminate lost motion between pinion 19 and the lower end of the torque tube, and to that end, I provide a lever 35 which is fulcrumed on a pin 36 and bears at its free end against one side of pin 25, against which it is continuously pressed by a coil spring 37. This arrangement serves to keep the teeth of pinion 19 pressed against the teeth of rack 21 and to keep pin 24 in constant pressing engagement with lever 27; also to keep lever 27 pressed against lug 29 while at the same time urging pin 28 against one side of the aperture in lever 27 through which it projects. By virtue of this provision the slightest torsional deflection of torque tube 8 is transmitted to index finger 16.

My invention is equally applicable to torque measuring wrenches designed to afford torque readings irrespective of the rotational direction in which the torque is applied, and I have shown in Figs. 4, 5 and 6 how the invention can be adapted to a wrench similar to that hereinbefore described but modified to provide two-way dial readings. Insofar as the component parts shown in Figs. 4-6 are identical with corresponding parts in Figs. 1-5, I have used the same reference numerals, but where any changes are involved I have employed new reference numerals.

Arm 40 performs the same function as arm 26 of the previously described structure, but, as shown, is somewhat shorter because in this case it is not required to transmit as much movement to the torque gauge as in the previous case.

Lever 41 corresponds functionally to lever 27, but differs therefrom structurally in such a way as to provide for two-way actuation of the torque gauge. In this case the lever has an elongate slot 42 which is engaged by lug 29; and the free end of said lever is bifurcated to provide a pair of spaced fingers 41a and 41b between which is positioned a depending pin 43, corresponding to pin 24.

The torque gauge, which I have identified as a whole by reference numeral 44, is substantially identical with that shown in U. S. Patent 2,320,023, granted to Herman W. Zimmerman, May 25, 1943, to which reference may be had for a more detailed description. This gauge comprises a mounting plate 45 which is fixedly secured to coverplate 13 and to which is attached a dial cover 46 having on one side a transparent window 47. Said window has inscribed upon it an index line 48 adapted to cooperate with a scale on the peripheral edge of a dial 49. Said dial is secured to a hub 50 which, in turn, is attached to a vertical shaft 51 with which the hub and dial rotate. To the lower end of shaft 51 is attached a pinion 52, corresponding to pinion 19 in the previously described structure. A slide plate or rack 53 is provided with teeth on one edge which mesh with pinion 52 and said rack is slidable lengthwise in a suitable groove milled in the bottom of mounting plate 45. Pin 43 is fixedly secured to rack 53 and projects through an elongate slot in plate 54. A knurled finger button 55 projects through an opening in dial cover 46 and is connected to shaft 51 and rotatable therewith.

As fully described in the aforementioned Zimmerman patent the function of finger button 55 is to enable the operator to move rack 53 lengthwise in order to bring pin 43 into engagement with one or the other of fingers 41a or 41b, depending upon the direction in which it is intended to rotate the wrench in applying force. If, for example, it is intended to rotate the wrench in a clockwise direction, as viewed from the top, it will be necessary to move pin 43 into engagement with finger 41a, and this is accomplished by manually rotating finger button 55 in the clockwise direction. When this adjustment has been made, dial cover 46 is manually rotated to bring index line 48 into registration with the zero line on the scale of dial 49. The wrench is then ready for use. If, on the contrary, it is intended to rotate the wrench in the counter-clockwise direction, finger button 55 will be rotated in the counterclockwise direction in order to move pin 43 into engagement with finger 41b. As before, dial cover 46 will be rotated to bring index line 48 into registration with zero on the dial scale.

Block 30 which carries lug 29 may be identical with block 30 of the previously described wrench and may be secured in its groove by means of a clamping screw 32.

The mode of adjustment to compensate for torque tube variations is identical with that of the previous case and need not be again described.

In the structure of Figs. 4-6 lost motion is removed by rotating finger button 55 and for that reason it is not necessary to provide means corresponding to parts 22, 25, 35, 36 and 37 of Figs. 1-3.

I claim:

1. A torque measuring wrench comprising a torque tube, a head member connected to one end of said torque tube and adapted for applying twisting force thereto, a work-engaging element connected to the other end of said torque tube, a torque indicating gauge carried by said head member substantially centrally with respect to the axis of the work-engaging element and having a gauge-actuator gear thereon, means interconnecting said work-engaging element with one side of said gear for actuating said gauge in proportion to the torsional deflection undergone by said torque tube, said means including multiplying mechanism actuated by said work-engaging element, and lost motion eliminating mechanism comprising a movable rack connected with another side of said gear independently of the connection of said interconnecting means therewith, the points of connection between said movable rack and said gear and between said interconnecting means and said gear lying in a common plane perpendicular to the axis of said gear, a spring urging said rack, gear and multiplying mechanism in a direction opposed to their respective directions of movement when actuated by said work-engaging element so that all torsional deflections of said torque tube in one direction, including small initial deflections, are transmitted to said gauge and backlash is eliminated between said gauge, said interconnecting means and said work-engaging element and said gear is maintained in one axis of rotation during use of the tool.

2. A torque measuring wrench including a handle member and a work-engaging element, yieldable means interconnecting said handle member with said element for transmitting the rotations of said handle member to said element while at the same time permitting a limited rotation of said element relatively to said handle member and proportionately to the applied torque, a torque indicating gauge carried by said handle member substantially centrally with respect to the axis of the work-engaging element, an arm rotatable with said element relatively to said handle member, a pivot element on said arm, a lever carried on the pivot element on said arm, a fulcrum operative on one end of said lever and radially spaced from the said pivot element, the other end of said lever being connected with said gauge and operative, conjointly with said arm, to actuate said gauge in proportion to the rotation of said element relatively to said handle member.

3. A torque measuring wrench including a handle member and a work-engaging element carried by said handle member, yieldable means interconnecting said handle member with said work-engaging element for transmitting the rotations of said handle member to said element while at the same time permitting a limited rotation of said element relatively to said handle member and proportionately to the applied torque, a torque indicating gauge carried by said handle member substantially centrally with respect to the axis of the work-engaging element, mechanism interconnecting said element with said gauge for actuating said gauge proportionately to the aforementioned relative rotation of said element, said mechanism including a pinion connected to said gauge, a rack member engaging said pinion, and a spring-pressed arm connected with said rack member and urging said rack member and mechanism in one direction to continuously contact the work-engaging element whereby to eliminate backlash between said element and said mechanism and between said mechanism and said gauge.

4. A torque measuring wrench comprising: a head member having a chamber, a torque tube projecting from and drivably connected at one end to said head member, a work-engaging member drivably connected to said torque tube at the end thereof remote from said head member, a rod extending axially through said torque tube and attached thereto only at a point remote from said head member, a removable coverplate forming a closure for said chamber, a torque gauge mounted on said plate, said gauge including an operating shaft and a pinion on said shaft, a pair of rack members meshed with said pinion, an actuating element movable by the rod to actuate the first one of said rack members for transmitting to said gauge the rotations of said rod caused by twisting of said torque tube, and a spring-pressed arm connected with the other of said rack members for continuously urging said other rack member in one direction whereby to eliminate backlash between said pinion and said first one of said rack members and also backlash between said actuating element and said first rack member.

5. A torque measuring wrench comprising: a head member having a chamber, a torque tube projecting from and drivably connected at one end to said head member, a work-engaging member drivably connected to said torque tube at the end thereof remote from said head member, a rod extending axially through said torque tube and attached thereto only at a point near said work-engaging member and remote from said head member, an arm attached to said rod within said chamber and extending laterally therefrom and rotatable therewith, a coverplate detachably secured to said head member and forming a closure for said chamber, a torque gauge carried by said coverplate and disposed approximately in axial alignment with said rod, said gauge including an operating shaft, a pinion on said shaft, a first rack member meshed with said pinion and a second rack member meshed with said pinion, a pivot element on said arm, a lever for actuating said first rack member and carried on said pivot remotely from the axis of said rod, said lever being disposed within said chamber and lying in a plane normal to said axis, a fulcrum for said lever, said fulcrum being adjustably movable toward and away from said axis, the end of said lever remote from said fulcrum being connected with said first rack member for actuating said gauge in conformity with rotations of said rod caused by twisting of said torque tube, and a spring-pressed arm engaging said second rack member and continuously urging said pinion, said first rack member and said actuating lever in a direction such as to eliminate backlash between said pinion, said first rack member, actuating lever and pivot element.

6. A torque-measuring wrench comprising a head member, a torque tube projecting from and drivably connected at one end to said head member, a work-engaging member drivably connected to said torque tube at the end thereof remote from said head member, a rod extending axially through said torque tube and connected thereto only at a point remote from said head member, a torque gauge disposed in axial alignment with the rod, a lever disposed radially with and remotely from the rod, a transverse extension on the end of the rod remote from the word-engaging member, a pivot on the extension to pivotally support the lever intermediate its ends and to move the lever in an arcuate path about the axis of the rod, a fulcrum supported in the head member and operative on the end of said lever remote from the rod, the other end of said lever being connected to said gauge for actuating the same in conformity with the relative rotation of said rod and said torque tube, said fulcrum being radially movable adjustably to vary the effective length of said lever.

HENRY ROBERT BILLETER.

REFERENCES CITED

The following references are of record in the file of this patent:

UNITED STATES PATENTS

| Number | Name | Date |
|---|---|---|
| 1,694,188 | Lewis | Dec. 4, 1928 |
| 2,219,632 | Naden | Oct. 29, 1940 |
| 2,260,358 | Zimmerman | Oct. 28, 1941 |
| 2,312,104 | Larson | Feb. 23, 1943 |
| 2,411,521 | Carliss | Nov. 26, 1946 |